Figure 3:
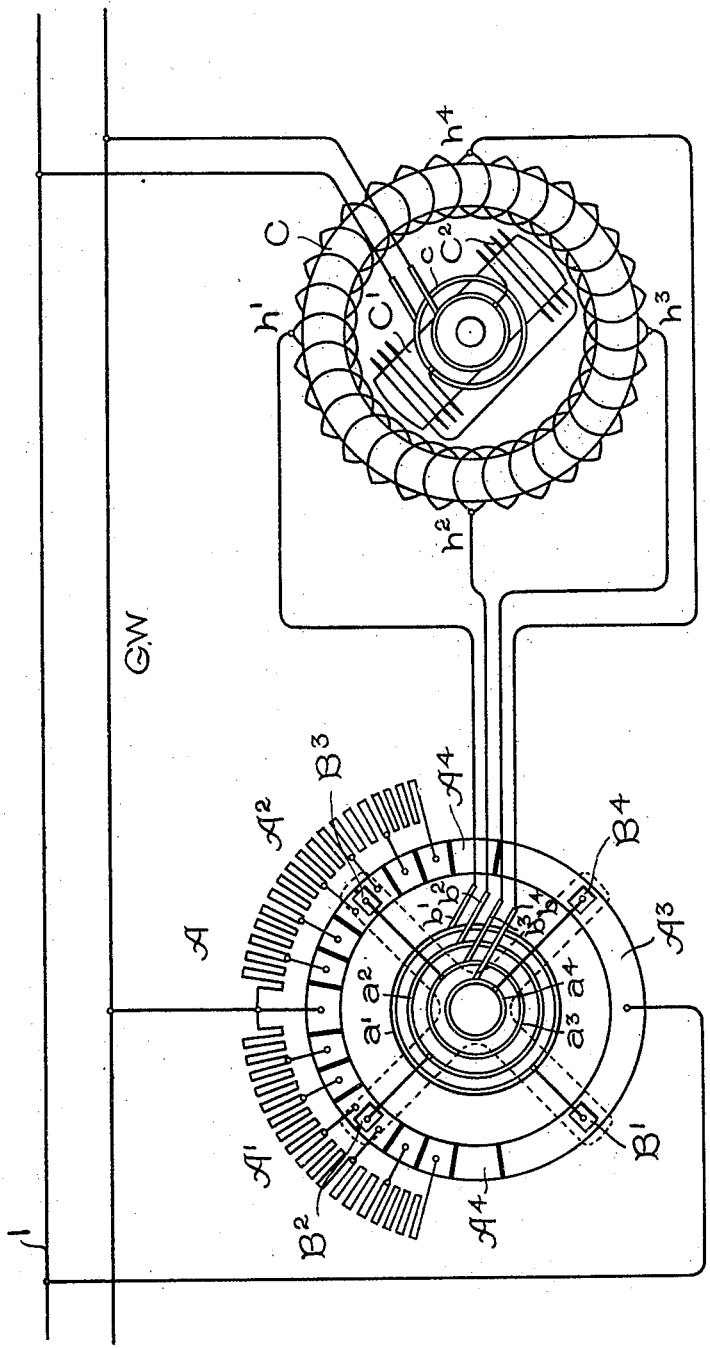

No. 647,940. Patented Apr. 24, 1900.
H. W. BUCK.
SYSTEM OF TRAIN CONTROL.
(Application filed Feb. 1, 1899.)
(No Model.) 2 Sheets—Sheet 1.
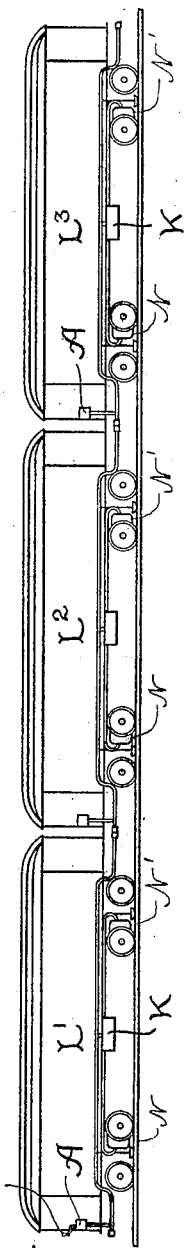
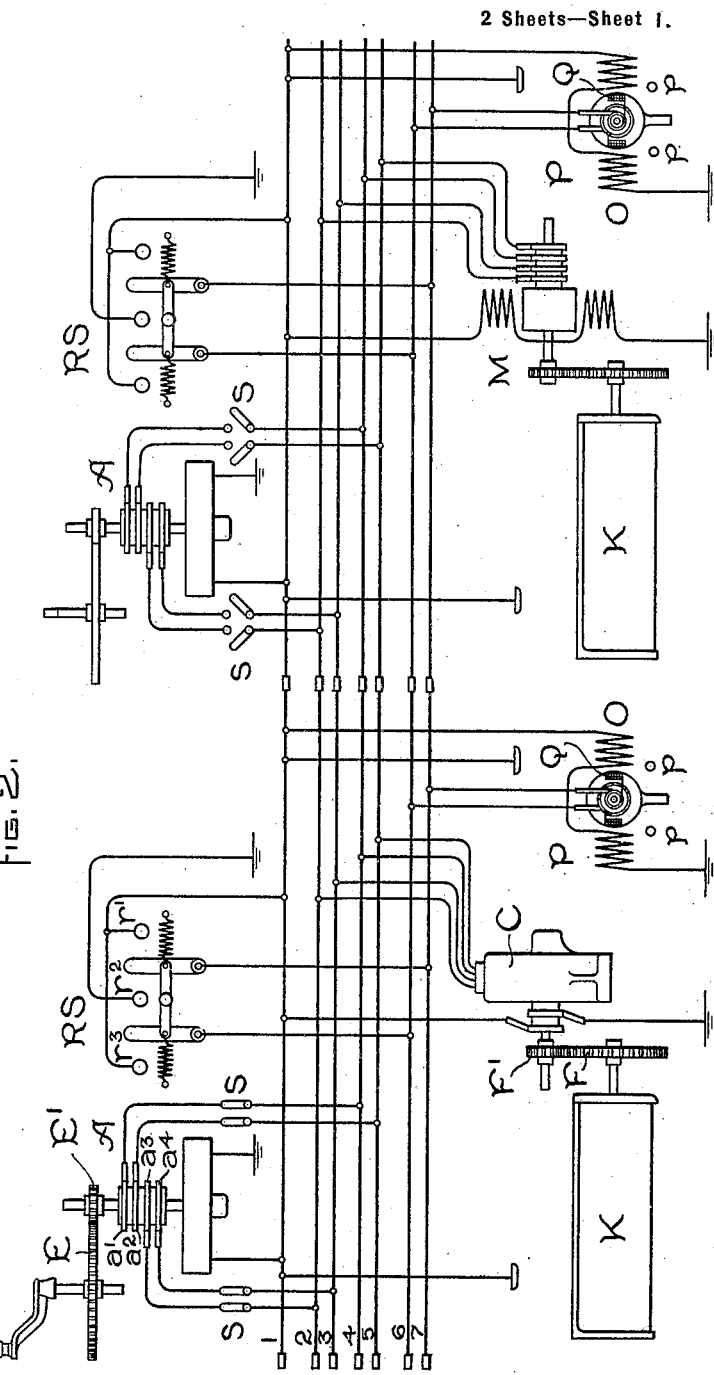
WITNESSES:
A. H. Abell.
A. F. Macdonald.
INVENTOR.
Harold W. Buck,
by Albert G. Davis
Atty.

No. 647,940. Patented Apr. 24, 1900.
H. W. BUCK.
SYSTEM OF TRAIN CONTROL.
(Application filed Feb. 1, 1899.)
(No Model.) 2 Sheets—Sheet 2.

WITNESSES.
A. H. Abell.
A. F. Macdonald.

INVENTOR.
Harold W. Buck,
by Albert G. Davis
Atty.

UNITED STATES PATENT OFFICE.

HAROLD W. BUCK, OF SCHENECTADY, NEW YORK, ASSIGNOR TO THE GENERAL ELECTRIC COMPANY, OF NEW YORK.

SYSTEM OF TRAIN CONTROL.

SPECIFICATION forming part of Letters Patent No. 647,940, dated April 24, 1900.

Application filed February 1, 1899. Serial No. 704,075. (No model.)

*To all whom it may concern:*

Be it known that I, HAROLD W. BUCK, a citizen of the United States, residing at Schenectady, in the county of Schenectady and State of New York, have invented certain new and useful Improvements in Systems of Train Control, (Case No. 861,) of which the following is a specification.

My present invention relates to the electric control of railway motors and trains. Many such systems have recently been devised embracing the principle of utilizing interchangeable motor-cars, all of which are equipped with the usual collecting devices, motors, and controllers of identical design or of such design that the cars may be operated conveniently in the same train, to these equipments so-called "master-controllers" being added, by means of which all of the motors of the train are simultaneously regulated to obtain the desired torque and speed and to be stopped and started together. The general principle here stated has been carried out in a number of different ways, some of which provide ordinary continuous-current motors now commonly called "pilot-motors" for rotating the controlling devices, each car having a controlling device for its own motors, and the arrangement of the circuits from the master-controller being such that the different motors which are geared to the controller are rotated to the same extent and practically simultaneously. Another system dispenses with the rotating motor and substitutes separately-controlled contacts, which may be operated by any convenient source of power, such as compressed air or electric current applied by magnets or similar devices.

It is to the first-named class of systems that my present invention relates; but by it instead of using the ordinary continuous-current motor for rotating the different motor-controllers I employ a novel device which is rotated by means of two-phase currents, themselves derived from the ordinary continuous-current supply by an intermediate mechanism which I operate as the master-controller. The motor-controller-operating part of the system consists of a Gramme ring with leads passing to it at a number of points—in this application four. Within the ring is a bar-magnet, which is usually provided with a certain amount of field-magnet winding connected across the mains and which operates as a revolving field. The master-controller transmits two-phase currents to the Gramme ring, polarizing the latter in the customary way, so that a so-called "rotary field" is set up, with the line of polarization of which the bar-magnet keeps step in its action. The frequency of the derived two-phase currents depends upon the speed of rotation of the master-controller. The latter device consists, briefly, of a pair of rheostats so connected across the mains that as one of them is cut in the other is cut out, and the circuits of the Gramme ring are connected at four points to the rheostat-switch, so that by the rotation of the latter two-phase currents, as already pointed out, are set up. The device in its general principles is much the same as that which is described and claimed in my pending application, Serial No. 681,972, filed May 28, 1898, and except in its present combination with other apparatus to make a train-control system is not claimed in the present application.

The invention will be better understood from the accompanying drawings, in which—

Figure 1 is a side elevation in diagram of a train equipped with the invention. Fig. 2 is a diagram of the circuits, and Fig. 3 is an enlarged view of the synchronous operating device or master-controller connected to the motor-controller apparatus.

For convenience of description Fig. 3 may be first referred to. In this, A is the master-controller, which consists of the two resistances $A'$ $A^2$, with a common connection to the ground wire GW of the controller. At the ends of the resistances are dead-contacts $A^4$ $A^4$ and a contact $A^3$, which is connected to the wire 1, which, as will be seen in Fig. 2, is the trolley lead passing through the train. It will be observed that the resistance-sections progressively increase from the common connection between the two to the contacts adjacent to the dead-contacts $A^4$. Collector-rings $a'$ to $a^4$ are connected to brushes $B'$ to $B^4$, respectively, the brushes rotating in quadrature over the rheostat-contacts, and brushes $b'$ to $b^4$ rest upon the respective collector-rings. Each of these latter brushes is connected by a lead to one of the points $h'$ to $h^4$ on the motor-controller-operating device C. This consists of a Gramme ring of the usual form, into which the leads from the rheostat are connected at points in quadrature. The field-magnet C' is provided with a collecting device $c$ and a coil $C^2$, which is connected across the mains. The operation of these parts is as follows: In the illustrated position current flows from the two brushes B' B⁴ upon the contact A³ of the rheostat through the collector-rings to the collector-ring brushes $b'\ b^4$ and thence to the points $h'\ h^4$ of the Gramme ring. These two points being at equal potential, no current flows in the section of the ring included between them; but current passes to the leads, leaving the ring at $h^2\ h^3$, between which points also no potential difference exists, to the brushes $b^2\ b^3$, and thence out at the brushes B² B³ of the rheostat and through portions of the resistances to the ground-wire. This connection establishes a line of polarization coincident with the illustrated position of the field-magnet. Suppose now that the rheostat-arms be turned to the right. Resistance A' is cut out gradually and resistance A² is increased. Assume, for instance, that the brush B² is on the last contact of the resistance A', brush B³ being on the last contact to the right of the resistance A² and brushes B' and B⁴ on the contact A³. Under these conditions the line of polarization will be shifted so as to nearly coincide with the points $h'\ h^3$ of the Gramme ring and the magnet C' will take a corresponding position, and when the brush B² is connected directly to the wire GW the brushes B' B³ will be on the dead-contacts A⁴, so that no current flows across them or from lead $h'$ to $h^3$ of the Gramme ring, the entire current passing from $h^4$ to $h^2$ and establishing a line of polarization passing directly through the leads $h'\ h^3$. The field-magnet will then take a corresponding position. It is manifest that if this operation is continued the magnet C' will rotate as waves of two-phase current pass around the Gramme ring, the line of polarization rotating as the rheostat-brushes rotate. Thus any determined position may be given to the field-magnet.

Referring now to the other figures, Fig. 1 shows cars L' L² L³, each of which is equipped with motors N N' and with the apparatus shown in Fig. 2, the apparatus being indicated in Fig. 1 only diagrammatically. In Fig. 2, however, in addition to the transmitting device, as illustrated in Fig. 3, the other parts necessary to make up a commercially-operative train-control system are indicated. At A is one of the master controllers or transmitters. This is geared to the handle D by the gears E E', so that it has a somewhat-increased rate of rotation relative to the handle. The motive part C of the transmitting arrangement is also connected by gears F F' to the controller K. As shown in Fig. 1 of the drawings, each of the motor-cars is provided with two motors N N', although the equipment of each car may evidently comprise any desired number of motors. The several motor equipments are each controlled by one of the controllers K; but the circuits of this controller are not shown in the drawings, as they would unnecessarily complicate the diagram, it being understood that any one of the well-known systems of control, preferably the series-parallel system, (of which the patent to Potter, No. 524,396, shows a good example,) would be employed. For the motive part of the transmission apparatus I may substitute, if desired, a two-phase synchronous motor, as shown at M on the right of the diagram; but ordinarily this would be more expensive and less desirable than the arrangement shown. The operation of this arrangement as illustrated is as follows: When the handle D is turned, the transmitter A is rotated and sends two-phase current through the motive device C, rotating the controller K to shift the motor-circuits in the usual manner. Of course any number of motive devices may be connected in multiple, as is indicated from the coupling devices diagrammatically shown between the two sets of apparatus shown in the figure, and all would be simultaneously operated.

With the arrangement thus shown some other contrivance is needed to operate the reversing-switches. This I have shown in the form of a simple throw-over device P, which would be connected in any usual or desired manner to the reversing-switch of the controller. In order to make the diagram more clear, I have not attempted to show this connection, which can readily be effected in many well-known ways. The throw-over device P is provided with stops $p$ and a coil Q upon its armature. A field-magnet coil O is in circuit between the trolley and ground and remains constantly energized. A manually-operated switch RS is provided on each car adjacent to the master-controller. This is, like the ordinary reversing-switch, provided with contacts $r'\ r^2\ r^3$. It will be seen that when the switch, for instance, touches the contacts $r^2\ r^3$ a circuit is completed from the trolley-wire 1 (which is connected to the trolleys T, here shown as the shoes of a third-rail system in the usual way) to the lead $r^3$, to the left-hand switch-blade through the coil Q, back to the right-hand switch-blade, contact $r^2$, and to ground, thus throwing the armature P against one of the stops $p$. When the switch-blades, however, touch the contacts $r'\ r^2$, this circuit is reversed and the armature is thrown against the other stop, of course with a corresponding shift of the reversing-switch to which it is connected.

As thus described, the device has all of its parts in circuit. It is at times desirable to cut out the master-controller, and for this purpose the switches S S are provided, as shown. Ordinarily these switches would be mechanically geared to the master-controller, so that with the first movement of the latter the switches would be closed; but this it is unnecessary to illustrate or describe.

Of course trailer or idle cars without motors or controllers could be used in the train without affecting the invention, it being only necessary to carry the circuit-wires through them in a cable.

Where the current to be handled by the converting device A is of higher potential than usual, a second rheostat like $A'$ $A^2$ may be substituted, if desired, for the contact $A^3$; but ordinarily this will not be needed.

What I claim as new, and desire to secure by Letters Patent of the United States, is—

1. In a train-control system, motor-cars each having a collecting device, motors and a motor-controller, polyphase motors operating the different controllers, a continuous-current-supply system, and hand-operated devices between the supply and the polyphase motors by the rotation of any one of which polyphase currents are derived from the continuous supply and transmitted to the polyphase motors.

2. In a train-control system, a plurality of cars each having a motor or motors and a motor-controller, polyphase motors for operating the different controllers, train-conductors to which the terminals of the said motors are connected, a continuous-current-supply system, and hand-operated devices between the supply system and said conductors, by the rotation of any one of which polyphase currents are derived from the continuous-current supply and transmitted to the polyphase motors.

3. In a train-control system, a plurality of cars, each having a motor or motors, a motor-controller and a reversing-switch, polyphase motors for operating the different controllers, electromagnetic devices for operating the different reversing-switches, a continuous-current-supply system, hand-operated devices between the supply system and the polyphase motors, by the rotation of any one of which polyphase currents are derived from the continuous-current supply and transmitted to the polyphase motors, and other hand-operated devices between the continuous-current supply and the reversing-switches, by the movement of any one of which all the reversing-switches will be actuated.

In witness whereof I have hereunto set my hand this 26th day of January, 1899.

HAROLD W. BUCK.

Witnesses:
B. B. HULL,
M. H. EMERSON.